(No Model.)
C. R. MACOMBER & E. V. SCRIBNER.
CHEMICAL ERASER.
No. 464,509. Patented Dec. 8, 1891.
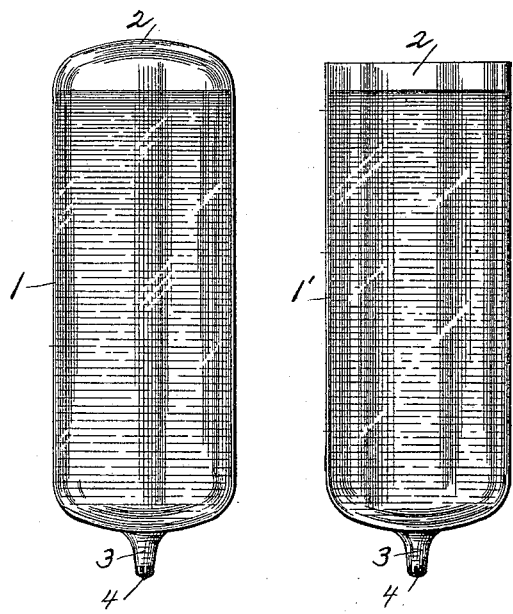
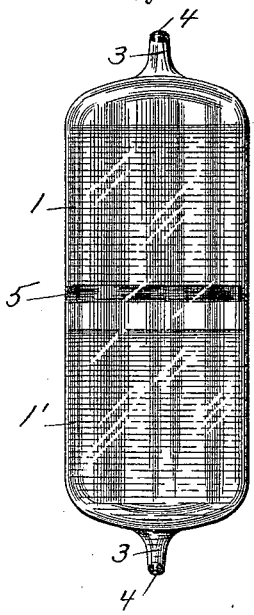
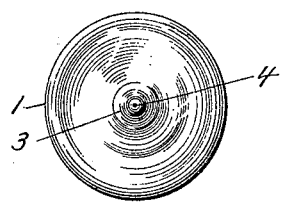
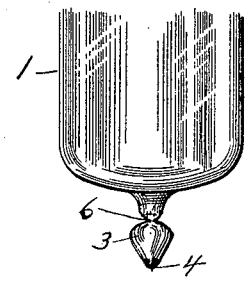
Witnesses
Chas. F. Schmelz.
Edmund F. Seymour
Inventors
Clarence R. Macomber
Ernest V. Scribner
By their Attorney
John C. Dewey.

UNITED STATES PATENT OFFICE.

CLARENCE R. MACOMBER AND ERNEST V. SCRIBNER, OF WORCESTER, MASSACHUSETTS.

CHEMICAL ERASER.

SPECIFICATION forming part of Letters Patent No. 464,509, dated December 8, 1891.

Application filed November 12, 1890. Serial No. 371,204. (No model.)

*To all whom it may concern:*

Be it known that we, CLARENCE R. MACOMBER and ERNEST V. SCRIBNER, citizens of the United States, and both residing at Worcester, in the county of Worcester and State of Massachusetts, have jointly invented a certain new and useful Chemical Eraser; and we do hereby declare that the following is a full, clear, and exact description thereof, which, in connection with the drawings, making a part of this specification, will enable others skilled in the art to which our invention belongs to make and use the same.

Our invention relates to an eraser, and more particularly to an eraser employing a chemical liquid for erasing or removing ink or other stains.

Our invention consists in the novel construction and operation of an eraser employing a chemical liquid, as will be hereinafter fully described.

Referring to the drawings, Figure 1 is an elevation of a pair of our erasers. Fig. 2 is an end view of the discharging end of the eraser, looking in the direction of arrow, Fig. 1. Fig. 3 is a modified construction of our eraser, and Fig. 4 is a modified construction of the discharging end of the eraser.

In our invention we preferably employ a pair of hollow vessels, preferably made of glass, which act as a reservoir to hold the chemical liquid. One of said vessels 1 contains one kind of chemical liquid and the other of said vessels 1' contains a different kind of chemical liquid. The hollow vessels may be made of the shape shown in Fig. 1, having a solid rounded or flat closed end 2 and a tapering end 3 made integral therewith with a blunted point and a single minute hole 4 therein (see Fig. 2) through which the chemical liquid in the vessel is discharged and applied on the ink or stain to be removed. It must be understood that the hole 4 in the end of the tube through which the liquid is discharged is very minute and the taper of the end not too pronounced, so that there may be no collection of air-bubbles to prevent the flow of the liquid. As there is only a single minute hole 4 in the vessel 1 at the discharging end thereof, there is no opportunity, when the vessel is filled with the chemical solution, for the air to enter and force out the liquid, as would be the case if there was a hole in the upper part of the vessel above the liquid, and, furthermore, there being only a single minute hole 4 in the vessel at the discharging end thereof, the liquid will only be discharged from the vessel when the same is held in an upright position, and then, by reason of there being no air-hole, the liquid will escape in a very small quantity from the vessel. When the vessel is not in use it may be laid on its side or inverted and there will be no discharge or escape of the liquid therefrom.

Instead of making two separate hollow vessels to hold the chemical liquid used in erasing the stains, we may make the two hollow vessels in one, as shown in Fig. 3, having a central division 5 separating the two liquids from each other, and having each end of the vessel made tapering and provided with a small hole therein for the passage of the liquid.

Instead of making the discharging end of the hollow vessels of the shape shown in Figs. 1, 2, and 3, we may make it of the shape shown in Fig. 4, having the body of the vessel contracted to form the neck 6. The object of forming the neck 6 between the body of the vessel and the discharging end is to form a seat upon which the liquid may strike, when it is partially used, preventing the force of the liquid coming directly on the opening in the end of the vessel and the too free flow of the liquid.

We may use any of the well-known solutions of chemical liquid in connection with our hollow vessel adapted to erase ink and other stains; but we prefer to use a saturated solution of chloride of lime and a solution of citric acid.

The operation of our chemical eraser is as follows: The hollow vessel 1, which acts as a reservoir, is filled with one kind of chemical liquid, as a saturated solution of chloride of lime, and the vessel 1', which also acts as a reservoir, is filled with another kind of chemical liquid, as a solution of citric acid. In order to distinguish the liquids apart, one of the vessels may be numbered or colored or the liquids may be of different colors, if preferred.

The liquid in one vessel, as 1, is first applied to the stain to be removed, said liquid passing through the hole 4 when the vessel is held in an upright position, as shown in Fig. 1, the blunt smooth end preventing any injury to the goods. The liquid is then applied from the other vessel, as 1', and the combined action of the two liquids, applied in this manner, will remove ink and other stains.

The operation of the double vessel (shown in Fig. 3) is to apply the liquid first from one end thereof and then from the other end thereof.

The value of our invention will be readily appreciated by those skilled in the art.

We provide a very simple contrivance for removing ink and other stains, and one which will not get out of order and which can easily be carried around, and when the liquid is all used the vessels can be refilled or new-filled vessels substituted in their place.

We have shown and described a hollow vessel of cylindrical shape for holding the chemical liquids; but we may use any form of hollow vessel for holding the chemical liquids, having a tapering end made integral therewith and a minute hole therein for the discharge of the liquid.

We are aware that prior to our invention an ink-eraser has been patented in which a tube consisting of several separate parts has been employed for holding chemical erasing material, and therefore we do not broadly claim a hollow vessel or tube for holding chemical erasing material.

We have not described herein the method of filling the hollow vessels or tubes with the chemical erasing-liquid, as our present invention relates simply to the novel construction of the hollow vessels or tubes, adapted to be charged with and hold the chemical erasing-liquid.

Having thus described our invention, what we claim as new, and desire to secure by Letters Patent, is—

In an ink-eraser, a pair of hollow vessels or tubes, each made in one piece adapted to hold a different chemical erasing-liquid, and each having a solid closed end made integral therewith, and each having a single minute hole in its opposite discharging end, said discharging end being made tapering and integral with the body of the tube, substantially as set forth.

CLARENCE R. MACOMBER.
ERNEST V. SCRIBNER.

Witnesses:
JOHN C. DEWEY,
EDMUND F. SEYMOUR.